US010078594B2

(12) United States Patent
Liu et al.

(10) Patent No.: US 10,078,594 B2
(45) Date of Patent: Sep. 18, 2018

(54) CACHE MANAGEMENT FOR MAP-REDUCE APPLICATIONS

(71) Applicant: International Business Machines Corporation, Armonk, NY (US)

(72) Inventors: Liang Liu, Beijing (CN); Junmei Qu, Beijing (CN); ChaoQiang Zhu, Beijing (CN); Wei Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/828,600

(22) Filed: Aug. 18, 2015

(65) Prior Publication Data
US 2016/0062900 A1 Mar. 3, 2016

(30) Foreign Application Priority Data

Aug. 29, 2014 (CN) .......................... 2014 1 0438255

(51) Int. Cl.
*G06F 12/08* (2016.01)
*G06F 12/0875* (2016.01)
*G06F 17/30* (2006.01)

(52) U.S. Cl.
CPC .... *G06F 12/0875* (2013.01); *G06F 17/30132* (2013.01); *G06F 17/30194* (2013.01)

(58) Field of Classification Search
CPC ........... G06F 12/0875; G06F 17/30132; G06F 17/30194; G06F 12/0806; G06F 12/0813;

(Continued)

(56) References Cited

U.S. PATENT DOCUMENTS 6,226,790 B1 * 5/2001 Wolf ..................... G06F 8/4441
717/135
8,108,863 B2 * 1/2012 Rakvic .................. G06F 9/4893
713/300

(Continued)

FOREIGN PATENT DOCUMENTS

CA        2843886 A1    2/2013
CN      102779025 A    11/2012

(Continued)

OTHER PUBLICATIONS

Negi, Atul, and P. Kishore Kumar. "Applying machine learning techniques to improve linux process scheduling." TENCON 2005-2005 IEEE Region 10 Conference. IEEE, 2005.*

(Continued)

*Primary Examiner* — Mano Padmanabhan
*Assistant Examiner* — Andrew J Cheong
(74) *Attorney, Agent, or Firm* — Tihon Poltavets

(57) ABSTRACT

A computer manages a cache for a MapReduce application based on a distributed file system that includes one or more storage medium by receiving a map request and receiving parameters for processing the map request. The parameters include a total data size to be processed, a size of each data record, and a number of map requests executing simultaneously. The computer determines a cache size for processing the map request, wherein the cache size is determined based on the received parameters for processing the map request and a machine learning model for a map request cache size and reads, based on the determined cache size, data from the one or more storage medium of the distributed file system into the cache. The computer processes the map request and writes an intermediate result data of the map request processing into the cache, based on the determined cache size.

21 Claims, 4 Drawing Sheets

(58) Field of Classification Search
CPC ............... G06F 12/084; G06F 12/0842; G06F 12/0844; G06N 99/005
See application file for complete search history.

(56) References Cited

U.S. PATENT DOCUMENTS

| | | | |
|---|---|---|---|
| 8,321,454 B2 | 11/2012 | Berlyant et al. | |
| 8,560,779 B2* | 10/2013 | Castillo | G06F 12/0868 711/113 |
| 8,682,812 B1* | 3/2014 | Ranjan | H04L 63/1425 706/12 |
| 8,788,783 B1 | 7/2014 | Karnati et al. | |
| 9,244,751 B2* | 1/2016 | Cherkasova | G06F 11/3404 |
| 9,269,057 B1* | 2/2016 | Chandra | G06N 99/005 |
| 9,348,632 B2* | 5/2016 | Ge | G06F 9/45533 |
| 9,558,049 B1* | 1/2017 | Liu | G06F 9/544 |
| 2005/0102130 A1* | 5/2005 | Quirk | G06F 17/28 704/4 |
| 2010/0005266 A1* | 1/2010 | Shook | G06F 9/4435 711/172 |
| 2010/0179855 A1* | 7/2010 | Chen | G06Q 10/063 705/7.31 |
| 2011/0093253 A1* | 4/2011 | Kraft | G06F 11/3419 703/21 |
| 2011/0154341 A1* | 6/2011 | Pueyo | G06F 9/5066 718/101 |
| 2011/0264649 A1* | 10/2011 | Hsiao | G06N 5/022 707/722 |
| 2012/0016816 A1* | 1/2012 | Yanase | G06N 99/005 706/10 |
| 2012/0226639 A1* | 9/2012 | Burdick | G06F 9/4843 706/12 |
| 2012/0297145 A1* | 11/2012 | Castillo | G06F 12/0868 711/138 |
| 2013/0086355 A1* | 4/2013 | Narang | G06F 9/5066 712/30 |
| 2013/0110961 A1* | 5/2013 | Jadhav | G06F 15/167 709/213 |
| 2013/0144593 A1* | 6/2013 | Och | G06F 17/2845 704/2 |
| 2013/0167151 A1* | 6/2013 | Verma | G06F 9/5066 718/102 |
| 2013/0254246 A1 | 9/2013 | Lipcon | |
| 2013/0290223 A1* | 10/2013 | Chapelle | G06F 15/18 706/12 |
| 2013/0326538 A1* | 12/2013 | Gupta | G06F 9/50 718/107 |
| 2014/0026147 A1* | 1/2014 | Cherkasova | G06F 9/505 718/105 |
| 2014/0059552 A1* | 2/2014 | Cunningham | G09G 5/00 718/102 |
| 2014/0156777 A1* | 6/2014 | Subbiah | H04L 67/1097 709/213 |
| 2014/0215487 A1* | 7/2014 | Cherkasova | G06F 9/5083 718/106 |
| 2015/0127905 A1* | 5/2015 | Chang | G06F 12/0871 711/118 |
| 2015/0178342 A1* | 6/2015 | Seering | H04L 67/2823 707/754 |
| 2015/0195344 A1* | 7/2015 | Surendran | H04L 67/10 709/201 |
| 2015/0379425 A1* | 12/2015 | Dirac | G06N 99/005 706/12 |
| 2016/0034205 A1* | 2/2016 | Mehra | G06F 3/061 711/153 |
| 2016/0103845 A1* | 4/2016 | Yeddanapudi | G06F 17/30076 707/756 |
| 2016/0124730 A1* | 5/2016 | Boehm | G06F 8/45 717/149 |
| 2016/0179979 A1* | 6/2016 | Aasman | G06F 17/30584 707/603 |
| 2017/0083396 A1* | 3/2017 | Bishop | G06F 11/0793 |

FOREIGN PATENT DOCUMENTS

| | | |
|---|---|---|
| CN | 103902474 A | 7/2014 |
| WO | 2014085386 A1 | 6/2014 |

OTHER PUBLICATIONS

Fedorova, Alexandra, Margo I. Seltzer, and Michael D. Smith. "Cache-fair thread scheduling for multicore processors." (2006).*
Ekanayake, Jaliya, Shrideep Pallickara, and Geoffrey Fox. "Mapreduce for data intensive scientific analyses." eScience, 2008. eScience'08. IEEE Fourth International Conference on. IEEE, 2008.*
Application No. 201410438255.6 (China), titled "Cache Management Method and Apparatus for MapReduce Application," filed on Aug. 29, 2014, pp. 1-28.
Zhao et al., "Dache: A Data Aware Caching for Big-Data Applications Using the MapReduce Framework," Tsinghua Science and Technology, ISSN 1007-0214 05/10, vol. 19, No. 1, Feb. 2014, pp. 39-50.
Zhang et al., "Accelerating MapReduce with Distributed Memory Cache," 2009 15th International Conference on Parallel and Distributed Systems, IEEE Computer Society, pp. 472-478.
Zhang et al., "A Distributed Cache for Hadoop Distributed File System in Real-time Cloud Services," 2012 ACM/IEEE 13th International Conference on Grid Computing, IEEE Computer Society, pp. 12-21.

* cited by examiner

CACHE MANAGEMENT FOR MAP-REDUCE APPLICATIONS

CROSS REFERENCE

The present application claims the benefit of priority to Chinese Patent Application 201410438255.6, filed on Aug. 29, 2014, which is incorporated herein by reference in its entirety.

BACKGROUND

The present invention relates to a distributed file system, and more specifically, to cache management for a MapReduce application based on a distributed file system.

A distributed file system means physical storage resources managed by a file system are not necessarily directly connected to a local node, but rather, are connected to the node through a computer network. The distributed file system is designed based on a client/server model. A typical network might include a plurality of servers available for multi-user access.

MapReduce is a software architecture, proposed by Google, for large-scale parallel programming. Because the MapReduce architecture realizes parallel operation of a large-scale dataset (greater than 1 TB), and because scalability is realized through distribution of the operations on the large-scale dataset over a plurality of nodes on the network for parallel operation, a distributed file system is widely used. The concepts "Map" and "Reduce," are functions borrowed from functional programming languages. Implementation of the current MapReduce middleware requires an application developer to assign a Map function, for mapping a group of key values into new key-value pairs called "intermediate key-value pairs", and to designate a Reduce function to process the intermediate key value pairs that result from the Map function.

A typical distributed file system stores partitioned file blocks on a plurality of computing nodes, and duplicates each file block into a plurality of duplicate copies saved over different computing nodes. For a computation that requires repetitive iteration, the computing results of each iteration performed by MapReduce is written into the storage medium of the distributed file system, and then read out from the storage medium as the input data for the next iteration. As a result, the read/write operations for file blocks on multiple computing nodes will inevitably generate network overhead for file transfer, and result in computational delay.

Existing MapReduce architecture-based distributed file systems, e.g., Main Memory Map Reduce (M3R) and Apache™ Spark™ modify the existing MapReduce mechanism on an Apache™ Hadoop® basis, such that all Map task threads and Reduce task threads of a processing job share the memory space of one process, with the data being read into memory at one time. This enables subsequent processing to directly operate in memory, avoiding frequent accesses to the storage medium of the distributed file system, and replacing the storage medium accesses with memory operations. However, once a Map task or Reduce task of the job fails and it needs to be re-executed, all remaining Map tasks and Reduce tasks for that job will need to be re-executed as well, consuming considerable computing resources.

Other MapReduce architecture-based distributed file systems, for example, Tachyon and Redis systems, provide cache memory management. A MapReduce job's Mapper processing results can, in these systems, be cached in the cache memory managed by Tachyon and Redis, and subsequent iteration computations can directly read the data needed for computation from the cache memory. However, in the Tachyon system and Redis system, the data in the storage medium of the distributed file system is read into the cache memory according to a preset cache slice size, and an intermediate computation result of each reiteration is written into the cache memory according to the preset cache slice size. Different preset cache slice sizes can cause discrepancy in the read performance. In the case that the set cache slice size is relatively large, the data read speed is likely to be slower than reading from the storage medium, and the cache memory allocated for each Mapper will become greater, thereby restricting the number of Mappers that can run simultaneously, which further affects the performance. In the case that the set cache slice size is relatively small, data needs to be read from the storage medium more often. Because an open/close of the files in the distributed file system is required multiple times, a greater processing delay is generated. Moreover, if an insufficient number of Mappers execute simultaneously, part of cache memory can be in an idle state, which causes a waste.

Therefore, it is advantageous to configure a cache size for a MapReduce application based on a distributed file system that can efficiently cache the data of a MapReduce job needing iterative computations, to enhance the utilization of cache memory and shorten processing delays.

SUMMARY

Embodiments of the present invention disclose a method, computer program product, and system for managing a cache for a MapReduce application based on a distributed file system. A computer receives a map request for a MapReduce application on a distributed file system that includes one or more storage medium, receives parameters for processing the map request, the parameters including a size of the total data to be processed by a MapReduce job; a size of a data record; and a number of map requests executing simultaneously. The computer determines a cache size for processing the map request, wherein the cache size is determined based on the received parameters for processing the map request and a machine learning model for a map request cache size and reads, based on the determined cache size, data from the one or more storage medium of the distributed file system into the cache. The computer processes the map request and writes an intermediate result data of the map request processing into the cache, based on the determined cache size.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
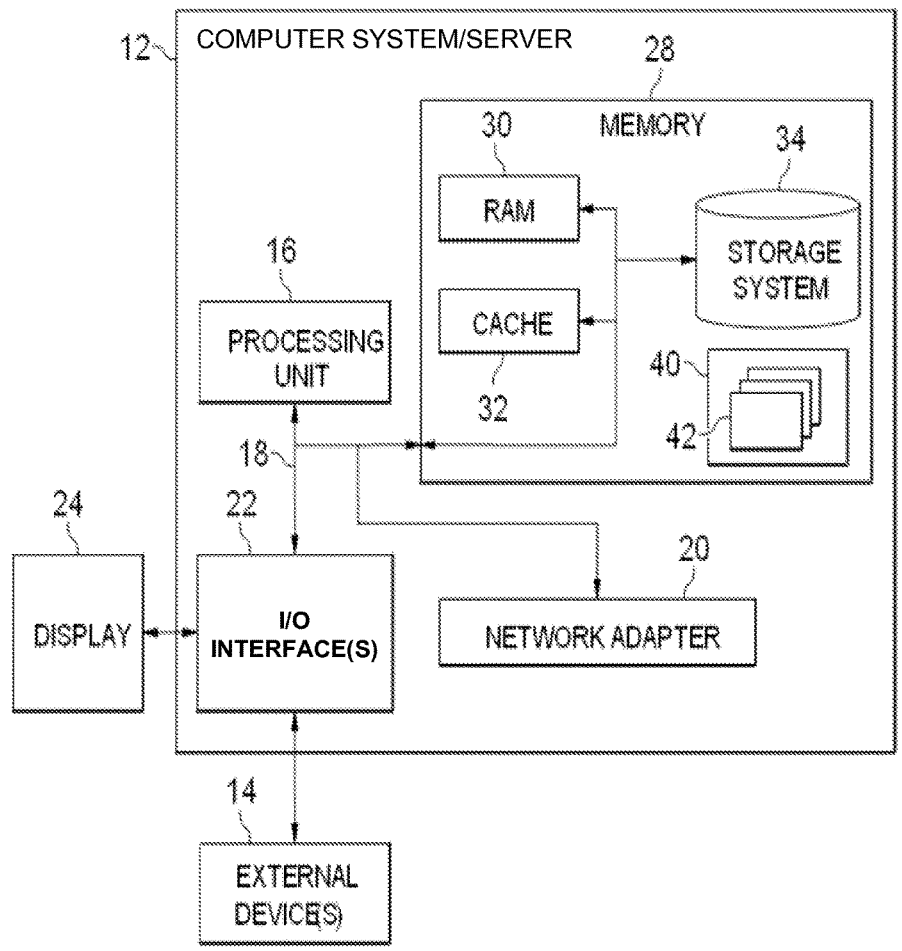
FIG. 1 depicts a block diagram of components of an exemplary computer system/server on which embodiments of the present invention can be executed.

Referring now to FIG. 1, in which an exemplary computer system/server 12 on which embodiments of the present invention can be executed, is depicted. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
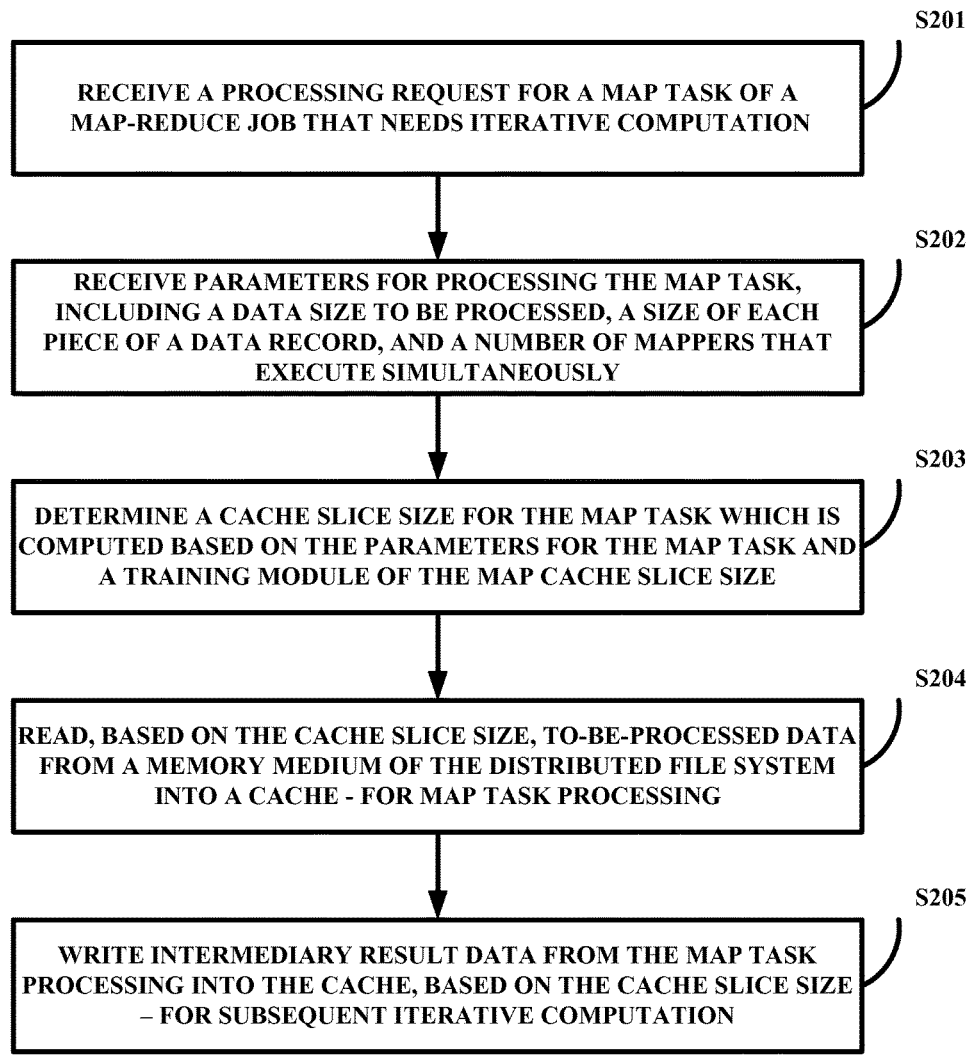
FIG. 2 illustrates cache management for a MapReduce application based on a distributed file system, in accordance with an embodiment of the present invention.

FIG. 2 illustrates cache management for a MapReduce application based on a distributed file system, in accordance with an embodiment of the present invention. At S201, a processing request for a Map task of a MapReduce job that needs iterative computation is received. At S202, parameters for processing the Map task are received. The parameters of the Map task include a size of the total data to be processed by the MapReduce job (hereinafter, total data size to be processed), a size of a data record, and the number of Mappers that execute simultaneously. At S203, a cache slice size for the Map task is determined. The cache slice size of the Map task is computed based on the parameters for the Map task and a machine learning, or training model, for the Map cache slice size. At S204, to-be-processed data from a storage medium of the distributed file system are read into a cache for processing by the Map task. At S205, intermediary result data from the Map task processing is written into the cache, based on the cache slice size, for subsequent iterative computation. S201-S204 can be performed by a Mapper on at least one computing node of the file distributed system. The cache in S201-S205 refers to cache memory on the computing node. The parameters for the Map task can also be specific for each computing node.

In various embodiments of the present invention, a MapReduce application based on a distributed file system can efficiently cache the data of a MapReduce job that needs iterative computation, can enhance the utilization of cache memory, and can reduce processing delay.

At S201, a processing request for a Map task of a MapReduce job that needs iterative computation is received. The MapReduce job request that is submitted by a user and needs iterative computation, is received by a JobTracker which splits the job submitted by the user into a plurality of tasks, including Map tasks and Reduce tasks. The JobTracker is in charge of allocating the Map tasks and the Reduce tasks to task trackers on multiple computing nodes.

Figure 3:
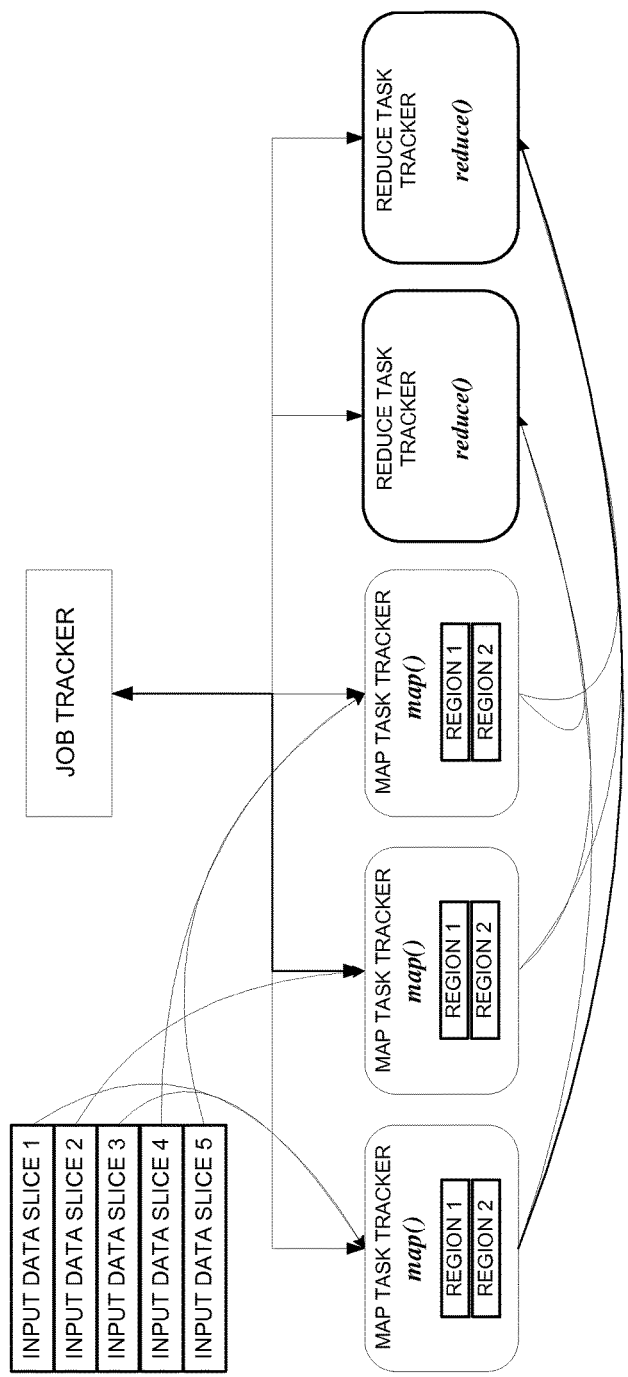
FIG. 3 is a schematic diagram of data transfer in a MapReduce architecture.

FIG. 3 is a schematic diagram of data transfer in the MapReduce architecture. JobTrackers and multiple TaskTrackers are two fundamental services of the MapReduce architecture. The JobTracker is deployed on a main node for receiving a job submitted by a user. The JobTracker uniformly schedules all jobs; manages the TaskTrackers on all computing nodes; splits each job submitted by the user into a plurality of tasks, including Map tasks and Reduce tasks, etc.; and allocates the tasks to task servers on multiple computing nodes. A task is a fundamental unit of work to be allocated to a task server on an appropriate computing node for execution. The TaskTracker allocating and executing a Map task is a MapTracker server, and the TaskTracker allocating and executing a Reduce task is a Reduce TaskServer. The TaskTrackers simultaneously execute and report the states of their respective tasks to the JobTracker, to help the JobTracker understand the overall condition of job execution.

Mapper and Reducer are two data processing primitives, wherein the Mapper is responsible for executing Map tasks that map the input key/value to an intermediate key/value, and the Reducer executes the Reduce task that operates on the intermediate result of the Map task and outputs a final result.

Returning now to FIG. 2, at S202, parameters for the Map task are received. The parameters include a total data size to be processed, a size of each data record, and the number of Mappers executed simultaneously. The parameters for the Map task may be received by the Mapper on each computing node from the JobTracker allocating the Map task.

At S203, a cache slice size for the Map task is determined. The cache slice size for the Map task can be determined, or computed, based on the parameters for the Map task and a training model of the Map cache slice size.

As described herein, the training model of the Map cache slice size is a first multiple linear regression model of a relationship between a Map task processing time and the cache slice size, in which the multiple linear regression model is trained based on historical records for the Map task, processed by at least one computing node, wherein the historical records for the Map task include: processing time of the Map task, data size being processed, size of each data record, and number of Mappers simultaneously executed by the computing node, and wherein the size of each data record is a minimum unit of the cache slice size. The multiple linear regression model is:

$$Y = \beta_0 + \beta_1 M + \beta_2 X/S + \beta_3 T/X + \epsilon, \quad (1)$$

wherein M denotes a number of Mappers simultaneously executed by a certain computing node, S denotes a size of each data record, T denotes a size of processed data, $\epsilon_0$ denotes a constant term coefficient, $\beta_1$, $\beta_2$, $\beta_3$ are partial regression coefficients, the meanings of $\beta_1$, $\beta_2$, $\beta_3$ are average change amounts of dependent variable Y when the independent variable changes one unit when other independent variables maintain constant. $\epsilon$ denotes a random error, also called residual, which denotes the part that cannot be explained by the independent variable in the change of Y; Y denotes the time when the computing node processes the Map task, X denotes a cache slice size for the computing node in processing the Map task. The multiple linear regression model is established based on historical records for the Map task:

1) inputting a result data $(Y_i, M_i, (X/S)_i, (T/X)_i)$ of the Map task observed in n times into the model, wherein i=1 ... n, result in the equation set:

$$Y_1 = \beta_0 + \beta_1 * M_{11} + \beta_2 * (X/S)_{21} + \beta_3 * (T/X)_{31} + \epsilon_1;$$

$$Y_2 = \beta_0 + \beta_1 * M_{12} + \beta_2 * (X/S)_{22} + \beta_3 * (T/X)_{32} + \epsilon_2;$$

$$Y_n = \beta_0 + \beta_1 * M_{1n} + \beta_2 * (X/S)_{2n} + \beta_3 * (T/X)_{3n} + \epsilon_n;$$

2) expressing the equation set into a matrix form, as follows:

$$\begin{bmatrix} Y_1 \\ Y_2 \\ \ldots \\ Y_n \end{bmatrix} = \begin{bmatrix} 1 & M_{11} & (X/S)_{21} & (T/X)_{31} \\ 1 & M_{12} & (X/S)_{22} & (T/X)_{32} \\ \ldots \\ 1 & M_{1n} & (X/S)_{2n} & (T/X)_{3n} \end{bmatrix} * \begin{bmatrix} \beta_0 \\ \beta_1 \\ \beta_2 \\ \beta_3 \end{bmatrix} + \begin{bmatrix} \epsilon_1 \\ \epsilon_2 \\ \ldots \\ \epsilon_n \end{bmatrix}$$

Assume $$Y = \begin{bmatrix} Y_1 \\ Y_2 \\ \ldots \\ Y_n \end{bmatrix} X = \begin{bmatrix} 1 & M_{11} & (X/S)_{21} & (T/X)_{31} \\ 1 & M_{12} & (X/S)_{22} & (T/X)_{32} \\ \ldots \\ 1 & M_{1n} & (X/S)_{2n} & (T/X)_{3n} \end{bmatrix} \beta = \begin{bmatrix} \beta_0 \\ \beta_1 \\ \beta_2 \\ \beta_3 \end{bmatrix} \epsilon = \begin{bmatrix} \epsilon_1 \\ \epsilon_2 \\ \ldots \\ \epsilon_n \end{bmatrix},$$

then the matrix may be simplified as $Y = X * \beta + \epsilon$, 3) resolving coefficients $\beta$ and $\epsilon$ using the ordinary least squares method; the principle of the ordinary least squares (OLS) is determining a regression parameter estimate value through resolving the least square sum of the residual error e (the estimate value of the error term); the computation process is specified below:

Seeking a set of coefficient estimate values $\hat{\beta}$, such that the residual square sum is the least, namely, min $\Sigma e_i^2 = (Y - X\hat{\beta})'(Y - X\hat{\beta})$ By resolving partial derivatives with respect to $\hat{\beta}$, deriving $$\frac{d\left((Y - X\hat{\beta})'(Y - X\hat{\beta})\right)}{d(\hat{\beta})} = 0$$

$$\hat{\beta} = (X'X)^{-1}(X'Y)$$

Substitute $\hat{\beta} = (X'X)^{-1}(X'Y)$ into $Y = X * \beta + \epsilon$ equation, deriving $$\epsilon = Y - X((X'X)^{-1}(X'Y))$$

The $\hat{\beta}$ here is $\beta$ and $\epsilon$ satisfying the model requirements; by substituting $\hat{\beta}$ and $\epsilon$ into equation (1), deriving the Map cache slice size training model of equation (1). The coefficients $\beta$ and $\epsilon$ of the model are not constant, but constantly modified by the result data $(Y_i, M_i, (X/S)_i, (T/X)_i)$ (wherein i=1 ... n) of the Map task, causing the training model to be more accurate.

Inputting the size T of the data processed by the Map task of the new MapReduce job, the size S of each data record, and the number M of Mappers simultaneously executed by the computing node into the multiple linear regression model in equation (1), the Map cache slice size satisfying a processing time condition of a specific Map task may be calculated, e.g., the optimal cache slice size for the Map task corresponding to the shortest processing time of the Map task with respect to the model, or the optimal cache slice size for the Map task corresponding to the processing time for obtaining a specific numerical value. Computation of the cache slice size can be executed by the JobTracker allocating the Map task, or can be executed by each respective computing node on which the Map task executes, which is not limited here.

At S204, to-be-processed data from a storage medium of the distributed file system are read into a cache, based on the cache slice size, for Map task processing. The Mapper on the computing node directly reads the data from the cache in order to perform Map computations.

At S205, the intermediate result data produced by the Map task are written into the cache for subsequent iterative computation, according to the cache slice size. A plurality of intermediate result data computed through multiple iterative computations are written into the cache, based on the cache slice size. The Mapper directly reads the intermediate result data from the cache for subsequent iterative computation. According to an embodiment of the present invention, at the completion of the iterative computations, the Mapper writes a final computation result of the Map task into a storage medium of the distributed file system for subsequent processing by the Reduce task. According to another embodiment of the present invention, at the completion of the iterative computations, the Mapper writes the final computation result of the Map task into the cache, according to the cache slice size, for subsequent processing by the Reduce task.

Cache management for a MapReduce application based on a distributed file system, according to embodiments of the present invention, can receive a cache slice size for the Map task which satisfies a specific Map task processing time condition for each computing node, through the Map cache slice size training model, which effectively lowers the network overhead for file transfer and reduces the processing time delay for MapReduce jobs with iterative computations.

Embodiments of the present invention include obtaining processing time of the Map task and modifying a coefficient of the first multiple linear regression model based on the parameters for the Map task. Based on the processing time of the Map task on the computing node, the total data size to be processed, the size of each data record, and the number of Mappers simultaneously executed by the computing node, the coefficient ($\beta_0$, $\beta_1$, $\beta_2$, $\beta_3$, $\epsilon$) of the first multiple linear regression model can be modified, such that the training model of the Map cache slice size is more accurate.

If the Reduce task is processed after the Map task, an embodiment of the present invention includes: receiving a processing request, submitted by a user, for a Reduce task of the MapReduce job that needs iterative computation; receiving parameters for the Reduce task which include a total data size to be processed, a size of each data record, and a number of Reducers that are executed simultaneously; determining a cache slice size for the Reduce task, wherein the cache slice size for the Reduce task is computed based on the parameters and a training model of the Reduce cache slice size. Computation of the cache slice size can be executed by a JobTracker allocating the Reduce tasks, or by each respective computing node, which is not limited here. Based on the cache slice size for the Reduce task, the final output resulting from the Map task can be read from the cache, for Reduce task processing, by a Reducer on at least one computing node of the distributed file system. Because a cache slice size for the Reduce task satisfying a specific Reduce task processing time can be obtained using a machine learning, or training, model of the Reduce cache slice size, performance loss caused by I/O operations and network transfers can be reduced, utilization of cache memory can be enhanced, and processing delay can be reduced.

As described herein, the training model of the Reduce cache slice size is a multiple linear regression model of a relationship between a Reduce task processing time and a cache slice size, in which the multiple linear regression model is trained based on historical records for the Reduce task processed by at least one computing node, wherein the historical records for the Reduce task include: processing time of the Reduce task, size of processed data, size of each data record, and number of Reducers simultaneously executed by the computing node. The multiple linear regression model is:

$$Y = \alpha_0 + \alpha_1 K + \alpha_2 X/L + \alpha_3 N/X + \epsilon, \quad (2)$$

wherein K denotes the number of Reducers simultaneously performed by a certain computing node, L denotes the size of each data record, N denotes the total data size to be processed, $\alpha_0$ denotes a constant term coefficient, $\alpha_1$, $\alpha_2$, $\alpha_3$ are partial regression coefficients, the meanings of $\alpha_1$, $\alpha_2$, $\alpha_3$ are average change amounts of dependent variable Y when the independent variable changes one unit when other independent variables maintain constant. $\epsilon$ denotes a random error, also called residual, which denotes the part that cannot be explained by the independent variable in the change of Y; Y denotes the time when the computing node processes the Reduce task, X denotes a cache slice size for the computing node in processing the Reduce task. Establishment of the multiple linear regression model is similar to the process of establishing a training model of the previous Map cache slice size, i.e., established based on historical records for the Reduce task:

1) inputting a result data ($Y_i$, $K_i$, $(X/L)_i$, $(N/X)_i$) of the Reduce tasks observed in n times into the model, wherein i=1 ... n, result in the equation set:

$$Y_1 = \alpha_0 + \alpha_1 * K_{11} + \alpha_2 * (X/L)_{21} + \alpha_3 * (N/X)_{31} + \epsilon_1;$$

$$Y_2 = \alpha_0 + \alpha_1 * K_{12} + \alpha_2 * (X/L)_{22} + \alpha_3 * (N/X)_{32} + \epsilon_2;$$

$$Y_n = \alpha_0 + \alpha_1 * K_{1n} + \alpha_2 * (X/L)_{2n} + \alpha_3 * (N/X)_{3n} + \epsilon_n;$$

2) expressing the equation set into a matrix form, as follows:

$$\begin{bmatrix} Y_1 \\ Y_2 \\ \ldots \\ Y_n \end{bmatrix} = \begin{bmatrix} 1 & K_{11} & (X/L)_{21} & (N/X)_{31} \\ 1 & K_{12} & (X/L)_{22} & (N/X)_{32} \\ \ldots \\ 1 & K_{1n} & (X/L)_{2n} & (N/X)_{3n} \end{bmatrix} * \begin{bmatrix} \alpha_0 \\ \alpha_1 \\ \alpha_2 \\ \alpha_3 \end{bmatrix} + \begin{bmatrix} \epsilon_1 \\ \epsilon_2 \\ \ldots \\ \epsilon_n \end{bmatrix}$$

Assume $$Y = \begin{bmatrix} Y_1 \\ Y_2 \\ \ldots \\ Y_n \end{bmatrix} X = \begin{bmatrix} 1 & K_{11} & (X/L)_{21} & (N/X)_{31} \\ 1 & K_{12} & (X/L)_{22} & (N/X)_{32} \\ \ldots \\ 1 & K_{1n} & (X/L)_{2n} & (N/X)_{3n} \end{bmatrix} \beta = \begin{bmatrix} \alpha_0 \\ \alpha_1 \\ \alpha_2 \\ \alpha_3 \end{bmatrix} \varepsilon = \begin{bmatrix} \varepsilon_1 \\ \varepsilon_2 \\ \ldots \\ \varepsilon_n \end{bmatrix}$$

then the matrix may be simplified as $Y = X * \alpha + \epsilon$, 3) resolving coefficients $\alpha$ and $\epsilon$ using the ordinary least squares method; the principle of the ordinary least squares (OLS) is determining a regression parameter estimate value through resolving the least square sum of the residual error e (the estimate value of the error term); the computation process is specified below:

Seeking a set of coefficient estimate values $\hat{\alpha}$, such that the residual square sum is the least, namely, min $\Sigma e_i^2 = (Y - X\hat{\alpha})'(Y - X\hat{\alpha})$ By resolving partial derivatives with respect to $\hat{\alpha}$, deriving $$\frac{d\left((Y - X\hat{\alpha})'(Y - X\hat{\alpha})\right)}{d(\hat{\alpha})} = 0$$

$\hat{\alpha} = (X'X)^{-1}(X'Y)$

Substitute $\hat{\alpha} = (X'X)^{-1}(X'Y)$ into $Y = X*\alpha + \epsilon$ equation, deriving $\epsilon = Y - X((X'X)^{-1}(X'Y))$ The $\hat{\alpha}$ here is $\alpha$ and $\epsilon$ satisfying the model requirements; by substituting $\hat{\alpha}$ and $\epsilon$ into equation (2), deriving the training model of the Reduce cache slice size of equation (2). The coefficients $\alpha$ and $\epsilon$ of the model are not constant, but constantly modified by the result data $(Y_i, K_i, (X/L)_i, (N/X)_i)$ (wherein i=1 ... n) of the Reduce task, causing the training model to be more accurate.

Inputting the parameters for the Reduce task, i.e., the size N of the data processed, the size L of each data record, and the number K of Reducers simultaneously executed by the computing node into the Reduce cache slice size training model in equation (2), the Reduce cache slice size satisfying a processing time condition of a specific Reduce task may be calculated, e.g., the optimal Reduce cache slice size corresponding to the shortest processing time of the Reduce task, or an optimal Reduce cache slice size corresponding to the processing time of a specific numeral value.

Those skilled in the art should understand, although the Map and Reduce cache slice size training models have been described above in detail with the example of the multiple linear regression model, the Map and Reduce cache slice size training models according to the embodiments of the present invention are not limited thereto, and Map and Reduce cache slice size training models may also be established using a polynomial model and a double-log model. The above described establishing procedure of training model is only exemplary, and the present invention is only dependent on a pre-existing training model, not limited to any specific establishing procedure of the training model.

Embodiments of the present invention include obtaining the processing time of the Reduce task and modifying a coefficient of the Reduce cache slice size based on the received parameters for the Reduce task and the processing time. Based on the processing time of the Reduce task, the total data size to be processed, the size of each data record, and the number of Reducers simultaneously executed, the coefficient ($\alpha_0, \alpha_1, \alpha_2, \alpha_3, \epsilon$) of the multiple linear regression model can be modified, such that the training model of the Reduce cache slice size can be more accurate.

Various embodiments of the present invention have been described with reference to the accompanying drawings. Those skilled in the art may understand that the above method may be implemented in software manner or in hardware manner or in a manner combining software and hardware. Moreover, those skilled in the art would appreciate that implementing various steps in the above method through software, hardware or a combination of software and hardware, a cache management apparatus for a MapReduce application based on a distributed file system may be provided. Even if the apparatus is identical to a general processing device in hardware structure, due to the function of the software included therein, the apparatus exhibits a characteristic distinct from the general processing device, thereby forming an apparatus of respective embodiments of the present invention.

Figure 4:
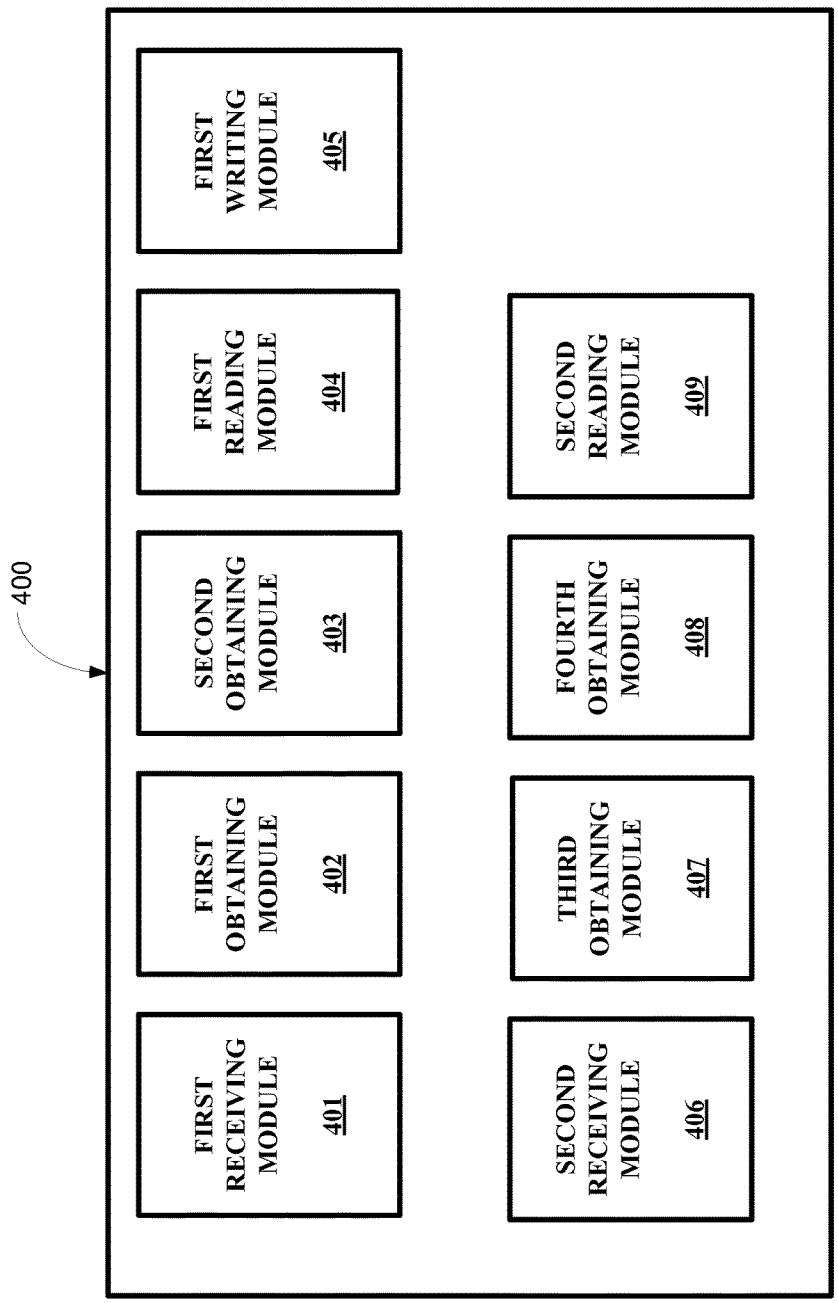
FIG. 4 illustrates a functional block diagram of an exemplary cache management environment for a MapReduce application based on a distributed file system, in accordance with an embodiment of the present invention.

FIG. 4 illustrates a functional block diagram of an exemplary cache management environment 400 for a MapReduce application based on a distributed file system, in accordance with an embodiment of the present invention. The exemplary cache management environment 400 includes a first receiving module 401 configured to receive a processing request for a Map task of a MapReduce job that needs iterative computation; a first obtaining module 402 configured to receive parameters for processing the Map task, the parameters of the Map task including a total data size to be processed, a size of each data record, and a number of Mappers that are executed simultaneously; a second obtaining module 403 configured to determine a cache slice size for the Map task, wherein the cache slice size of the Map task is computed based on the parameters for the Map task and a training model of the Map cache slice size; a first reading module 404 configured to read, based on the cache slice size, to-be-processed data from a storage medium of the distributed file system into a cache, for Map task processing; a first writing module 405 configured to write an intermediary result data of the Map task processing into the cache based on the cache slice size, for subsequent iterative computation.

According to embodiments of the present invention, the first writing module 405 is further configured to, at the completion of the iterative computation, write a final computation result of the Map task into the cache according to the cache slice size for subsequent Reduce task processing.

According to embodiments of the present invention, the training model of the Map cache slice size is a first multiple linear regression model of a relationship between a Map task processing time and the cache slice size, in which the first multiple linear regression model is established based on historical records of a Map task processed by at least one computing node, wherein the historical records of the Map task include: processing time of the Map task, a total data size to be processed, a size of each data record, and a number of Mappers simultaneously executed by the computing node.

According to embodiments of the present invention, the first obtaining module 402 is further configured to obtain processing time of the Map task and correct a coefficient of the first multiple linear regression model based on the received parameters for the Map task and the processing time.

According to embodiments of the present invention, the environment 400 further includes a second receiving module 406 configured to receive a processing request, submitted by a user, for a Reduce task of a MapReduce job that needs iterative computation; a third obtaining module 407 configured to receive parameters for processing the Reduce task, the parameters including a total data size to be processed, a size of each data record, and a number of Reducers that are simultaneously executed; a fourth obtaining module 408 configured to determine a cache slice size of the Reduce task, wherein the cache slice size of the Reduce task is computed based on the parameters and a training model of the Reduce cache slice size; and a second reading module 409 configured to read out a final output result of a Map task from the cache, based on the cache slice size of the Reduce task, for Reduce task processing.

According to embodiments of the present invention, the training model of the Reduce cache slice size is a second multiple linear regression model of a relationship between a Reduce task processing time and a cache slice size, in which the second multiple linear regression model is established based on historical records for a Reduce task processed by at least one computing node, wherein the historical records for the Reduce task include: processing time of the Reduce task, a total data size to be processed, a size of each data record, and a number of Reducers simultaneously executed by the computing node.

According to embodiments of the present invention, the third obtaining module 407 is further configured to obtain the processing time of the Reduce task and correct a coefficient of the second multiple linear regression model based on the received parameters for the Reduce task and the processing time.

Those skilled in the art should understand, if the MapReduce job that needs iterative computation only performs Map task processing, without a need of Reduce task processing, then the second receiving module 406, the third obtaining module 407, the fourth obtaining module 408, and the second reading module 409 are unnecessary; therefore, the four modules are optional.

The specific implementation method of each of the above modules refers to the detailed depiction of cache management for a MapReduce application based on a distributed file system according to embodiments of the present invention, which will not be detailed here.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions, and the like can be made without departing from the spirit of the invention, and these are, therefore, considered to be within the scope of the invention, as defined in the following claims.

What is claimed is:

1. A method for optimizing a cache on a computing node for a MapReduce application on a distributed file system, the method comprising: training a first machine learning model to determine an optimal cache slice size on the computing node for processing a map request in a shortest processing time based on first parameters in historical records for previously executed map tasks on the computing node, the first parameters including a first total data size to be processed, a first size of each data record, and a number of map tasks that will execute simultaneously on the computing node; receiving, by a computer, the map request for the MapReduce application on the distributed file system that includes one or more storage medium connected to the computing node; receiving, by the computer, first parameters for processing the map request; determining, by the trained first machine learning model, the optimal cache slice size for the computing node for processing the map request corresponding to the shortest processing time of the map request, wherein the optimal cache slice size is determined based on the received first parameters for processing the map request; reading, by the computing node, based on the determined optimal cache slice size, data from the one or more storage medium of the distributed file system into the cache of the computing node; processing, by the computing node, the map request; and writing, by the computing node, a final result data of the map request processing to the one or more storage medium.

2. The method according to claim 1, further comprising: responsive to the received map request processing requiring an iterative computation, performing one or more times:
writing, by the computing node, an intermediate result data of the map request processing into the cache of the computing node, based on the determined optimal cache slice size;
reading, by the computing node, the intermediate result data from the cache of the computing node, based on the determined optimal cache slice size;
processing, by the computing node, the map request; and
responsive to the map request requiring another iteration, writing, by the computing node, a second intermediate result data of the map request processing into the cache of the computing node, based on the determined optimal cache slice size, or responsive to the map request completing the iterative computation, writing, by the computing node, the final result data of the map request processing to the one or more storage medium.

3. The method according to claim 1, wherein the first machine learning model for the optimal map request cache slice size is a first multiple linear regression model of a relationship between a map request processing time and the optimal cache slice size in which the first multiple linear regression model is established based on historical records of previously executed map tasks executed by at least one computing node, wherein the historical records of the previously executed map tasks include: a processing time of the map request, the first total data size to be processed, the first size of each data record, and the number of map tasks executing simultaneously on the computing node.

4. The method according to claim 3, further comprising:
determining, by the computer, a processing time of the map request; and
correcting, by the computer, a coefficient of the first multiple linear regression model based on the determined map request processing time and the received first parameters for processing the map request.

5. The method according to claim 1, further comprising: training a second machine learning model to determine a second optimal cache slice size on the computing node for processing a reduce request in a shortest processing time based on second parameters in historical records for previously executed reduce tasks on the computing node, the second parameters including a second total data size to be processed, a second size of each data record, and a number of reduce tasks that will execute simultaneously on the computing node; receiving, by the computer, the reduce request for the MapReduce application on the distributed the system; receiving, by the computer, second parameters for processing the reduce request; determining, by the trained second machine learning model, the second optimal cache slice size for the computing node for processing the reduce request corresponding to the shortest processing time of the reduce request, wherein the second optimal cache slice size is determined based on the received second parameters; reading, by the computing node, the final result data of the map request processing from the one or more storage medium, based on the determined second optimal cache slice size; processing, by the computing node, the reduce request; and writing, by the computing node, a final result data of the reduce request processing to the one or more storage medium.

6. The method according to claim 5, wherein the second machine learning model for the optimal reduce request cache slice size is a second multiple linear regression model of a relationship between a reduce request processing time and the second optimal cache slice size, in which the second multiple linear regression model is established based on historical records of previously executed reduce tasks executed by at least one computing node, wherein the historical records of the previously executed reduce tasks include: a processing time of the reduce request, the second total data size to be processed, the second size of each data record, and the number of reduce tasks executing simultaneously on the computing node.

7. The method according to claim 6, further comprising: determining, by the computer, the processing time of the reduce request; and correcting, by the computer, a coefficient of the second multiple linear regression model based on the determined reduce request processing time and the received second parameters for processing the reduce request.

8. A computer program product for optimizing a cache on a computing node for a MapReduce application on a distributed file system, the computer program product comprising one or more computer readable storage medium and program instructions stored on at least one of the one or more computer readable storage medium, the program instructions comprising; program instructions to train a first machine learning model to determine an optimal cache slice size on the computing node for processing a map request in a shortest processing time based on first parameters in historical records for previously executed map tasks on the computing node, the first parameters including a first total data size to be processed, a first size of each data record, and a number of map tasks that will execute simultaneously on the computing node; program instructions to receive, by a computer, the map request for the MapReduce application on the distributed file system that includes one or more storage medium connected to the computing node; program instructions to receive, by the computer, first parameters for processing the map request; program instructions to determine, by the trained first machine learning model, the optimal cache slice size for the computing node for processing the map request corresponding to the shortest processing time of the map request, wherein the cache slice size is determined based on the received first parameters for processing the map request; program instructions to read, by the computing node, based on the determined optimal cache slice size, data from the one or more storage medium of the distributed the system into the cache of the computing node; program instructions to process, by the computing node, the map request; and program instructions to write, by the computing node, a final result data of the map request processing to the one or more storage medium.

9. The computer program product according to claim 8, further comprising:
responsive to the received map request processing requiring an iterative computation, performing one or more times:
program instructions to write, by the computing node, an intermediate result data of the map request processing into the cache of the computing node, based on the determined optimal cache slice size;
program instructions to read, by the computing node, the intermediate result data from the cache, based on the determined optimal cache slice size;
program instructions to process, by the computing node, the map request; and
program instructions, responsive to the map request requiring another iteration, to write, by the computing node, a second intermediate result data of the map request processing into the cache, based on the determined optimal cache slice size, and responsive to the map request completing the iterative computation, to write, by the computing node, the final result data of the map request processing to the one or more storage medium.

10. The computer program product according to claim 8, wherein the machine learning model for the optimal map request cache slice size is a first multiple linear regression model of a relationship between a map request processing time and the optimal cache slice size in which the first multiple linear regression model is established based on historical records of previously executed map tasks executed by at least one computing node, wherein the historical records of the previously executed map tasks include: a processing time of the map request, the first total data size to be processed, the first size of each data record, and the number of map tasks executing simultaneously on the computing node.

11. The computer program product according to claim 10, further comprising:
program instructions to determine, by the computer, a processing time of the map request; and
program instructions to correct, by the computer, a coefficient of the first multiple linear regression model based on the determined map request processing time and the received parameters for processing the map request.

12. The computer program product according to claim 8, further comprising: program instructions to train a second machine learning model to determine a second optimal cache slice size on the computing node for processing a reduce request in a shortest processing time based on second parameters in historical records for previously executed reduce tasks on the computing node, the second parameters including a second total data size to be processed, a second size of each data record, and a number of reduce tasks that will execute simultaneously on the computing node; program instructions to receive, by the computer, the reduce request for the MapReduce application on the distributed file system; program instructions to receive, by the computer, second parameters for processing the reduce request; program instructions to determine, by the trained second machine learning model, the second optimal cache slice size for the computing node for processing the reduce request corresponding to the shortest processing time of the reduce request, wherein the second optimal cache slice size is determined based on the received second parameters; program instructions to read, by the computing node, the final result data of the map request processing from the one or more storage medium, based on the determined second optimal cache slice size; program instructions to process, by the computing node, the reduce request; and program instructions to write, by the computing node, a final result data of the reduce request processing to the one or more storage medium.

13. The computer program product according to claim 12, wherein the second machine learning model for the optimal reduce request cache slice size is a second multiple linear regression model of a relationship between a reduce request processing time and the second optimal cache slice size, in which the second multiple linear regression model is established based on historical records of previously executed reduce tasks executed by at least one computing node, wherein the historical records of the previously executed reduce tasks include: a processing time of the reduce request, the second total data size to be processed, the second size of each data record, and the number of reduce tasks executing simultaneously on the computing node.

14. The computer program product according to claim 13, further comprising: program instructions to determine, by the computer, the processing time of the reduce request; and program instructions to correct, by the computer, a coefficient of the second multiple linear regression model based on the determined reduce request processing time and the received second parameters for processing the reduce request.

15. A computer system for optimizing a cache on a computing node for a MapReduce application on a distributed file system, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising: program instructions to train a first machine learning model to determine an optimal cache slice size on the computing node for processing a map request in a shortest processing time based on first parameters in historical records for previously executed map tasks on the computing node, the parameters including a first total data size to be processed, a first size of each data record, and a number of map tasks that will execute simultaneously on the computing node; program instructions to receive, by a computer, the map request for the MapReduce application on the distributed file system that includes one or more storage medium connected to the computing node; program instructions to receive, by the computer, first parameters for processing the map request; program instructions todetermine, by the trained first machine learning model, the optimal cache slice size for the computing node for processing the map request corresponding to the shortest processing time of the map request, wherein the cache slice size is determined based on the received first parameters for processing the map request; program instructions to read, by the computing node, based on the determined optimal cache slice size, data from the one or more storage medium of the distributed file system into the cache of the computing node; program instructions to process, by the computing node, the map request; and program instructions to write, by the computing node, a final result data of the map request processing to the one or more storage medium.

16. The computer system according to claim 15, further comprising:
responsive to the received map request processing requiring an iterative computation, performing one or more times:
program instructions to write, by the computing node, an intermediate result data of the map request processing into the cache of the computing node, based on the determined optimal cache slice size;
program instructions to read, by the computing node, the intermediate result data from the cache, based on the determined optimal cache slice size;
program instructions to process, by the computing node, the map request; and
program instructions, responsive to the map request requiring another iteration, to write, by the computing node, a second intermediate result data of the map request processing into the cache, based on the determined optimal cache slice size, and responsive to the map request completing the iterative computation, to write, by the computing node, the final result data of the map request processing to the one or more storage medium.

17. The computer system according to claim 15, wherein the machine learning model for the optimal map request cache slice size is a first multiple linear regression model of a relationship between a map request processing time and the optimal cache slice size in which the first multiple linear regression model is established based on historical records of previously executed map tasks executed by at least one computing node, wherein the historical records of the previously executed map tasks include: a processing time of the map request, the first total data size to be processed, the first size of each data record, and the number of map tasks executing simultaneously on the computing node.

18. The computer system according to claim 17, further comprising:
program instructions to determine, by the computer, a processing time of the map request; and
program instructions to correct, by the computer, a coefficient of the first multiple linear regression model based on the determined map request processing time and the received parameters for processing the map request.

19. The computer system according to claim 15, further comprising: program instructions to train a second machine learning model to determine a second optimal cache slice size on the computing node for processing a reduce request in a shortest processing time based on second parameters in historical records for previously executed reduce tasks on the computing node, the second parameters including a second total data size to be processed, a second size of each data record, and a number of reduce tasks that will execute simultaneously on the computing node; program instructions to receive, by the computer, the reduce request for the MapReduce application on the distributed the system; program instructions to receive, by the computer, second parameters for processing the reduce request; program instructions to determine, by the trained second machine learning model, the second optimal cache slice size for the computing node for processing the reduce request corresponding to the shortest processing time of the reduce request, wherein the second optimal cache slice size is determined based on the received second parameters; program instructions to read, by the computing node, the final result data of the map request processing from the one or more storage medium, based on the determined second optimal cache slice size; program instructions to process, by the computing node, the reduce request; and program instructions to write, by the computing node, a final result data of the reduce request processing to the one or more storage medium.

20. The computer system according to claim 19, wherein the second machine learning model for the optimal reduce request cache slice size is a second multiple linear regression model of a relationship between a reduce request processing time and the second optimal cache slice size, in which the second multiple linear regression model is established based on historical records of previously executed reduce tasks executed by at least one computing node, wherein the historical records of the previously executed reduce tasks include: a processing time of the reduce request, the second total data size to be processed, the second size of each data record, and the number of reduce tasks executing simultaneously on the computing node.

21. The computer system according to claim 20, further comprising: program instructions to determine, by the computer, the processing time of the reduce request; and program instructions to correct, by the computer, a coefficient of the second multiple linear regression model based on the determined reduce request processing time and the received second parameters for processing the reduce request.

* * * * *